United States Patent [19]

Sherwood

[11] 4,425,617
[45] Jan. 10, 1984

[54] HIGH-SPEED DATA SORTER

[75] Inventor: David L. Sherwood, Maple Shade, N.J.

[73] Assignee: RCA Corporation, New York, N.Y.

[21] Appl. No.: 246,647

[22] Filed: Mar. 23, 1981

[51] Int. Cl.³ .......................... H04J 3/08; H04J 6/00
[52] U.S. Cl. .................................... 364/200; 364/900
[58] Field of Search ... 364/900 MS File, 200 MS File

[56] References Cited

U.S. PATENT DOCUMENTS

| | | | |
|---|---|---|---|
| 3,900,834 | 8/1975 | Casey et al. | 364/200 |
| 3,900,846 | 8/1975 | Gibbon et al. | 343/6 R |
| 3,949,376 | 4/1976 | Ball et al. | 364/200 |
| 3,979,733 | 9/1976 | Fraser | 364/200 |
| 4,060,805 | 11/1977 | McComas | 343/6.5 LC |
| 4,099,256 | 7/1978 | Draper | 364/900 |
| 4,157,586 | 6/1979 | Gannon | 364/200 |
| 4,168,523 | 9/1979 | Chari et al. | 364/200 |
| 4,170,039 | 10/1979 | Beacom et al. | 364/200 |
| 4,203,107 | 5/1980 | Lovercheck | 364/200 |
| 4,218,756 | 8/1980 | Fraser | 364/200 |

Primary Examiner—Charles E. Atkinson
Assistant Examiner—Jameson Lee

Attorney, Agent, or Firm—Joseph S. Tripoli; Robert L. Troike; Christopher L. Maginniss

[57] ABSTRACT

In a data processing and distribution system, a data sorter is disclosed for receiving formatted blocks of digital data, acting on those blocks according to the informational content stored therein and responsive to control data stored within the data sorter, and generating sorting tags to be added to the data blocks for proper identification by one or more data processors. Selected portions of each data block provide addressing signals to a memory which output data is compared to specified values. For one value of memory output data, the entire data block is dumped; for a second value, the contents of the addressed memory location are changed to a selected value; for a small range of values of memory output data, a new memory location is accessed; and for the balance of the values, the memory output data is the sorting tag to be combined with the data block. The data sorter is capable of having its memory tables altered by an external processor, thereby providing adaptive and flexible control of the data sorting function.

7 Claims, 10 Drawing Figures

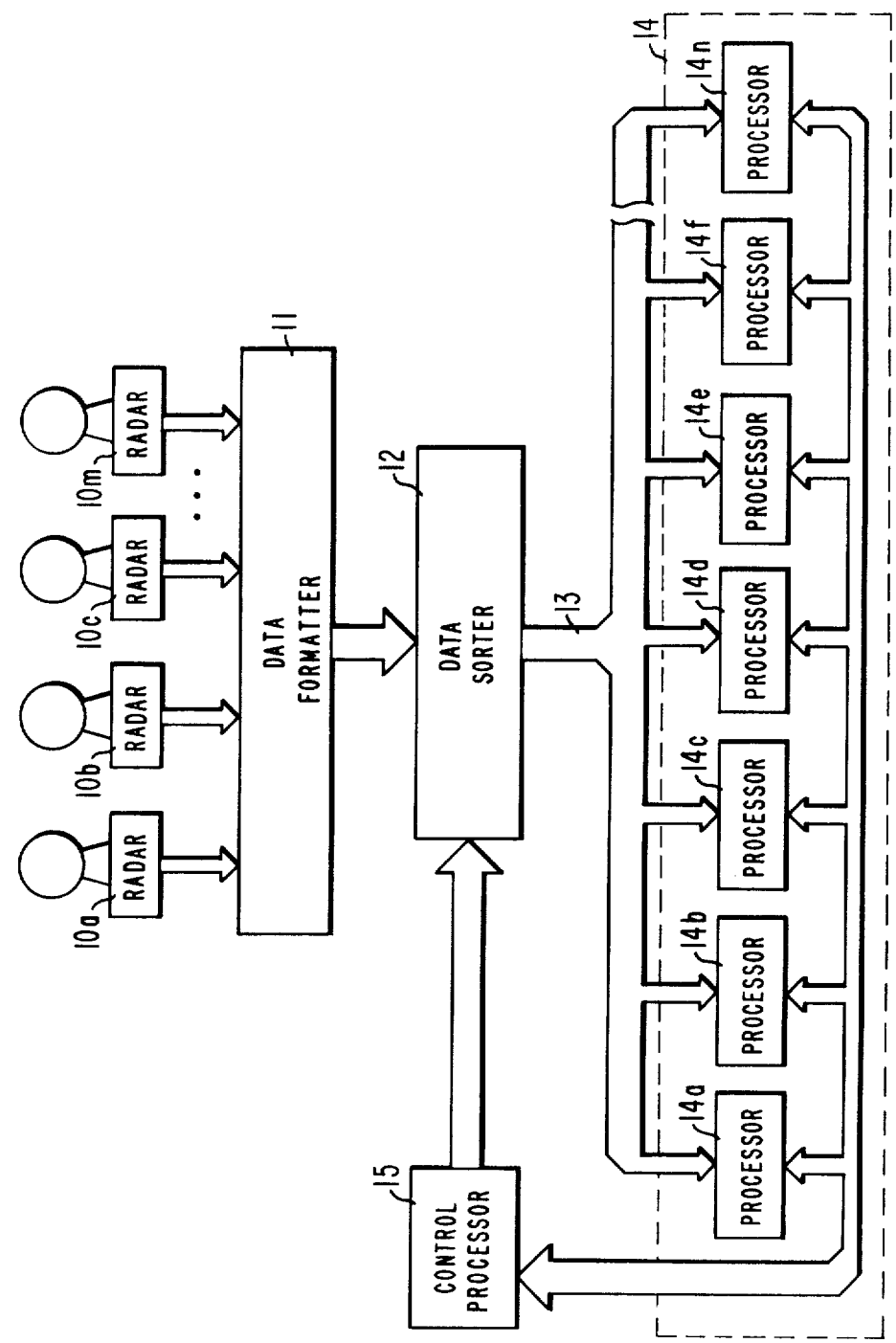

| | | |
|---|---|---|
| WORD 5 | AZIMUTH | FREQUENCY |
| WORD 4 | AMPLITUDE | PULSE WIDTH |
| WORD 3 | TIME OF ARRIVAL ||
| WORD 2 | FORMATTED PARAMETRIC DATA ||
| WORD 1 | (NOT USED) | SEGMENT ADDRESS |
| | BIT 31 · BIT 6 | BIT 5 · BIT 0 |

| | | | |
|---|---|---|---|
| WORD 5 | AZIMUTH | FREQUENCY ||
| WORD 4 | AMPLITUDE | PULSE WIDTH ||
| WORD 3 | TIME OF ARRIVAL |||
| WORD 2 | FORMATTED PARAMETRIC DATA |||
| WORD 1 | SORTING TAG | SEGMENT ADDRESS | GRID ADDRESS |
| | BIT 31 · BIT 16 | BIT 15 · BIT 10 | BIT 9 · BIT 0 |

HIGH-SPEED DATA SORTER

The Government has rights in his invention pursuant to Contract No. DAAK20-79-C-0516 awarded by the Department of the Army.

This invention relates to high-speed data sorting and, in particular, to a subsystem which receives a block of digital data, rapidly associates the data block with a sorting tag, and outputs the block of data with the sorting tag in its header word.

A data sorter of this description finds application, for example, in an aircraft tracking system in which the output pulses from a radar, or group of radars, are applied to a formatting unit which digitizes the radar pulses into data blocks arranged according to a predetermined format. It should be noted that it need not be a system requirement that the data blocks all have the same format. The data sorter receives the data blocks, analyzes the relevant data therein, and affixes a sorting tag to the header word of the data block. The data block is then applied to a bus structure common to several signal processing computers in a multiprocessing system. The computers are individually programmed to respond to specific sorting tags and to act on the data contained in the associated block. Data sorting systems traditionally fall into two broad categories, simple and intelligent. A simple data sorter performs a minimal analysis of the data block, tends to analyze all data blocks in identical or similar manners, and is relatively inflexible in its mode of analysis. This inflexibility reduces its operational effectiveness under changing system requirements, and also places a limitation on the application of its design principles to other types of systems. The major advantage of the simple data sorter is its throughput rate; data passes through it after only a small delay in storage registers. The analysis is made and the sorting tag affixed at a speed associated with a small number of logic element delay levels and memory accesses while the data block is clocked through a data sorter register.

An intelligent data sorter employs a controller having decision-making functions, typically a computer used for signal processing. The intelligent data sorter can perform extensive analysis on the data block, it can demonstrate great creativity in its analysis of different types of data, and it is more responsive to changes in system requirements than is the simple data sorter. The major drawback to the intelligent data sorter is its inability to maintain a high rate of throughput. The controller must perform an analysis based on the content of the data block which must be made in the real time domain. The number of processing steps and variability of processing time would limit the data handling rate of the system to, at best, the average processing delay time encountered in the pulse sorter subsystem. The intelligent pulse sorter approach is therefore unsuitable for high density pulse data routing.

In terms of system architecture, the simple data sorter employs the wired-program approach. It is composed mainly of logic elements, e.g., gates, latches, and multiplexers, and also read-only memories (ROM's) which contain the sorting tags and possibly a minimum amount of control data. The intelligent data sorter employs the stored-program approach, utilizing a process controller, e.g., a microprocessor operating on a program stored in ROM, and a number of random access memories (RAM's), which are operationally alterable memories, to maintain the dynamic tables.

The data sorter which is the subject of the present disclosure employs features of both types of architecture with the resulting advantage of operational flexibility while maintaining a very high throughput rate. It operates in a mode independent of a stored-program process controller but with a RAM table structure having the dynamic qualities usually associated with a stored program, while providing the capability of complete memory restructuring while in an off-line mode under the control of a microprocessor.

In accordance with one embodiment of the present invention, an apparatus is disclosed which generates routing information and adds it to a block of digitized data being sent between a source of such data and a utilization device. The generating and adding operations occur without significantly affecting the rate at which the block of data passes from the source to the utilization device. The apparatus includes a first memory for providing predetermined data signals in response to the data of a first segment of the data block. Portions of the data of a second segment of the data block are selected under control of the data signals provided by the first memory. The selected data signals, in combination with the data of the first segment of the data block, form addressing signals which are applied to a second memory. The data words accessed from the second memory are compared to specified values and control signals are generated corresponding to those values. One of the control signals so generated causes the data word accessed from the second memory to be combined with the block of digitized data being transmitted to the utilization device.

In the drawing:

FIG. 1 is an overall block diagram of the system in which the invention finds application;

In the following description of the invention, it will be assumed that the invention is being employed in a radar system and that the raw data being received are the reflected pulses. Each of the pulses is analyzed by appropriate logic elements for certain parameters, such as amplitude, pulse width, time of reception, frequency of the carrier, and other characteristics which are then recorded in a block of data words with each data word describing one or more characteristics.

The quantity of such data is very large in a radar system and requires very large data handling capabilities in the receiver.

In a military application, the signals from several different radar systems might be received by the equipment with the pulses from each different radar system having characteristics by which the equipment may be identified. It is desirable in such cases to route the blocks of data identifying the received pulses from a given radar source to a specific processor in the receiver so that a given processor is responsible for one particular radar system. Other processors in the receiver are assigned the responsibility of receiving and processing the blocks of data representing received radar pulses from other sources. Another approach would be to assign to each processor all targets within a specified sector of the sky. Using this approach the radar pulses would require characteristics for identifying the azimuth and elevation of the targets for routing to the proper processor.

In the system incorporating the present invention, shown in block diagram form in FIG. 1, the several radar systems 10a, 10b, ... 10m, referred to collectively as radar systems 10, feed their pulse data into a data formatter 11, which converts the pulse data from each radar system 10 into a block of 32-bit digital words. Each formatted digitized pulse contains from four to sixteen words. One example of a possible formatting scheme is shown in FIG. 2a.

Figures 2A, 2B, 2C:
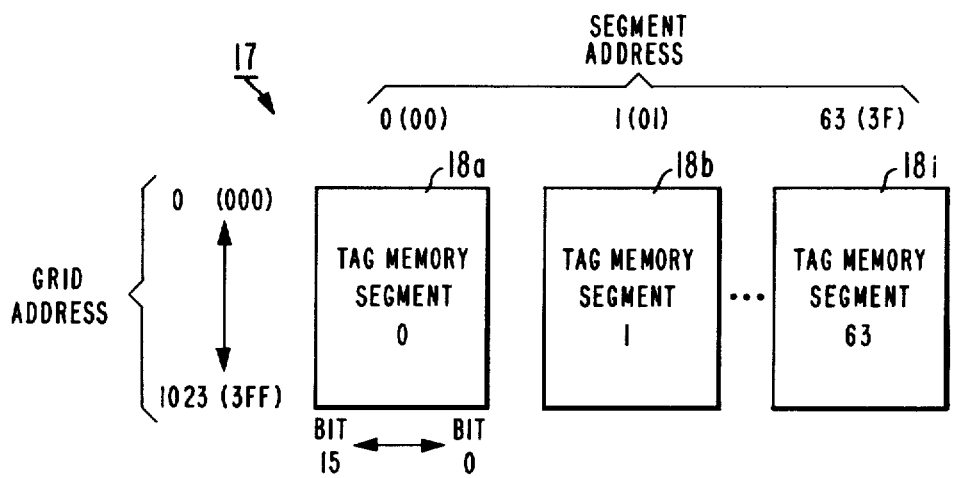
FIGS. 2a and 2b are charts showing the organization of one form of data block suitable for use in the present embodiment at two stages of processing.
FIG. 2c is a memory map depicting the form of sorting tag memory structure utilized in the applicant's embodiment.

Following a conventional handshaking scheme between the formatter 11 and the data sorter 12, which details are not material to this disclosure, the entire block of formatted pulse data is transmitted from the formatter 11 to the data sorter 12 where six bits of segment address data and a 32-bit word containing formatted parametric data, shown as word 2 in the word structure in FIG. 2a, are used in conjunction with memory data stored within the data sorter 12 to generate a 16-bit sorting tag. This sorting tag is appended to the pulse data block from the formatter 11, as shown in FIG. 2b, and transmitted on a data pipeline 13 interconnecting a multiprocessing system 14. Data pipeline 13 is, in its most basic embodiment, a 32-bit data bus which carries blocks of data from the data sorter 12 to the plurality of processors 14a, 14b, ... 14n. More sophisticated embodiment of the pipeline 13 would include storage and clocking capability to thereby permit external control of the flow of tagged data blocks to the multiprocessing system 14.

Each processor 14a, 14b, ... 14n is preassigned to input the data blocks on the data pipeline 13 corresponding to specified sorting tags. An alternative to the multiprocessing system 14 comprising a plurality of processors 14a, 14b, ... 14n is a single processor having a plurality of direct memory access (DMA) channels coupled to the data pipeline 13.

In response to control signals in the multiprocessing system 14, a control processor 15 may modify the contents of memories resident within the data sorter 12, thereby dynamically restructuring the data sorter 12 on the basis of changing system requirements. It should be noted, however, that the control processor 15 is not required by the data sorter 12 and one should note in the discussion that follows that, absent the signals from the control processor 15, the data sorter 12 would continue to operate as a highly effective link in the radar pulse data processing system of FIG. 1.

FIG. 2c depicts the elements into which the applicant has chosen to subdivide the tag memory 17 which will be discussed in more detail in connection with FIGS. 4, 5, and 7. The tag memory 17 has a capacity of 65,536 (64K) words of 16 bits each. Sixteen address lines are required for a memory of this size. The applicant has subdivided the tag memory 17 into 64 tag memory segments 18a, 18b, ... 18i, referred to collectively as tag memory segments 18. Each tag memory segment 18 comprises 1024 words of sixteen bits. The sixteen address lines are divided as follows: six address lines are required to select a tag memory segment 18, and ten address lines are required to select a particular word within that segment 18. The six tag memory segment select lines are referred to throughout this application as segment address lines; the ten lines which provide the word selection are referred to as grid address lines. The segment addresses range from zero to 63 (3F in hexadecimal) and the grid addresses range from zero to 1023 (3FF in hexadecimal).

Figure 3:
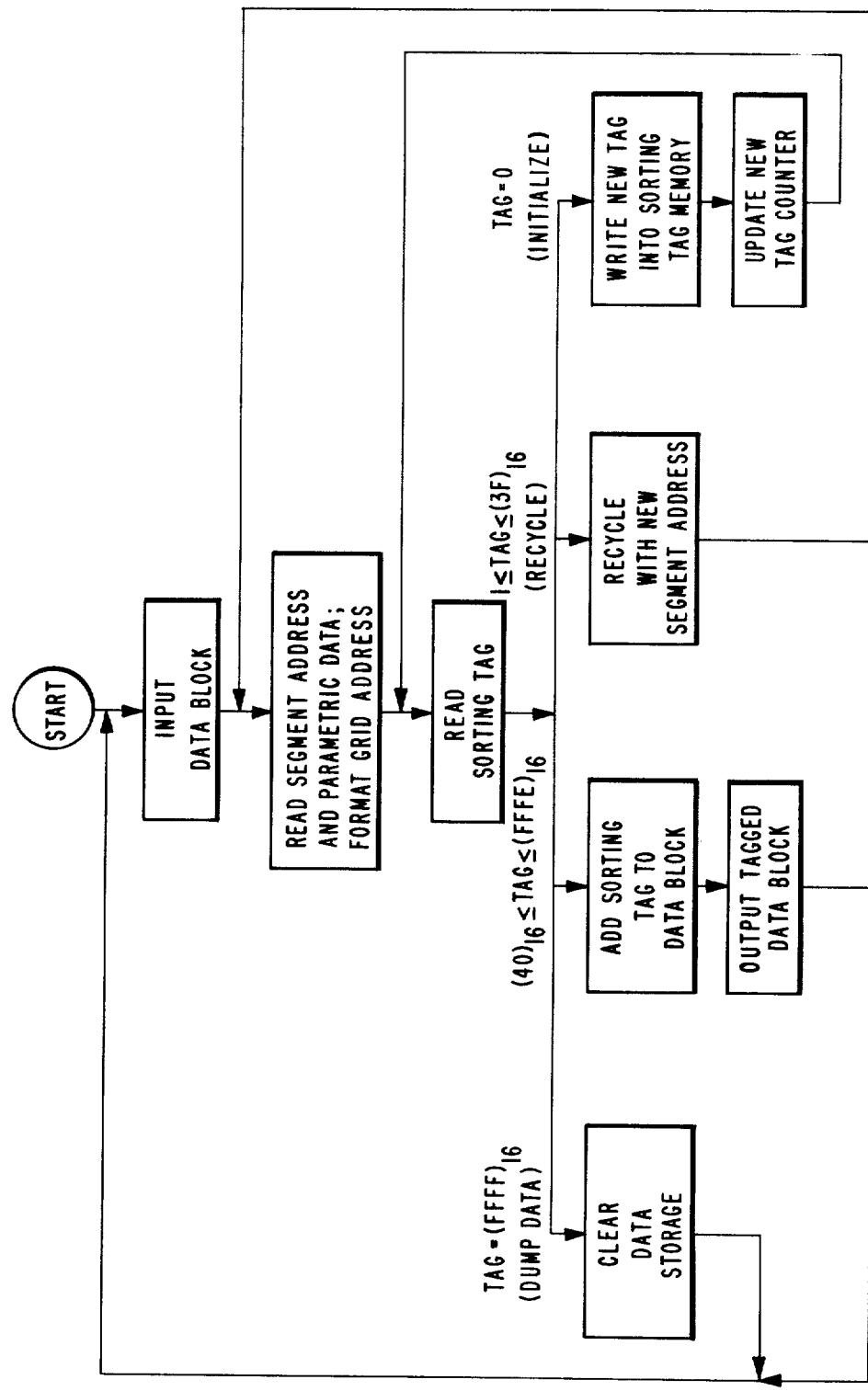
FIG. 3 is a system flow chart detailing the functional steps involved in the operation of the invention.

FIG. 3 is a flow chart showing the overall system operations performed by the data sorter 12. In the first operation the block of input data is transferred from the data formatter 11 into the data sorter 12. The next operation reads the segment address from the input data and, using the tag memory segment address and the formatted parametric data word of the input data, formats the grid address of a location within the tag memory segment. Using the grid address and the segment address, the next operation reads the sorting tag from the location addressed in the tag memory. The sorting tag is analyzed and put into one of four categories. If it has the value $(FFFF)_{16}$, or $(65,535)_{10}$, the entire block of input data is dumped, and operation control readies to read in a new block. If the sorting tag has a value between $(40)_{16}$ through $(FFFE)_{16}$, or $(64)_{10}$ through $(65,534)_{10}$, inclusive, the sorting tag is merged into the block of input data and the block is readied for transfer to the multiprocessing system 14 via the data pipeline 13. If the sorting tag has a value between one and $(3F)_{16}$, or $(63)_{10}$, inclusive, the tag number is recycled via a second sorting tag access using the first sorting tag as the new segment address. Finally, a sorting tag value of zero indicates that the tag storage has not yet been initialized at this location, and initialization is accomplished by writing the contents of the new tag counter into the accessed location of the tag memory and, after updating the new tag counter, re-reading the sorting tag in the addressed tag memory location.

It is thus seen that sorting tag values between zero and $(3F)_{16}$, or $(63)_{10}$, inclusive, and $(FFFF)_{16}$, or $(65,535)_{10}$, provide adaptive control to the data sorter 12. The remaining tag values, between $(40)_{16}$, or $(64)_{10}$, and $(FFFE)_{16}$, or $(65,534)_{10}$ inclusive, are the true sorting tags which are combined with the input data block and transmitted onto the data pipeline 13. The process by which the sorting tag is combined with the input data block involves configuring a data word with the sorting tag and the segment and grid addresses, as seen in word 1 of the word structure of FIG. 2b, and transmitting this word on the data pipeline 13. This first word is followed on the data pipeline 13 by word 2 and all subsequent words of the data block in the same format as they were received by the data sorter 12. (See words 2,3,4 and 5 of FIGS. 2a and 2b.)

The three control functions of the tag memory contents, initialize tag storage, dump data, and recycle segment address, provide those features to the present invention which make it operationally flexible and adaptive, while maintaining a high rate of data throughput. When the data sorter 12 is first activated no tags exist in the tag memory 17, that is, all locations contain zero, and every input data block with a different parameter word requires a cycle to assign a tag value to the tag memory address location. This is accomplished by the initialize tag storage cycle which causes a new tag value to be written into the tag memory 17 at the addressed location.

The dump data function is obtained whenever the accessed sorting tag is all ones. There are two principal reasons for providing this function. First, all tag memory locations which will not be accessed during a specified time period may have all ones written as contents so that the dump data function may provide a means for detecting and clearing erroneous input data. If one or more bit errors in the segment address or formatted parametric data portions of the input data block cause an unused portion of the tag memory 17 to be accessed, the entire data block will be dumped. The second reason for providing this function is to allow predetermined classes of input data to be disregarded. It may be desired, for example, to mask out all transmissions of a given frequency; by writing all ones into each tag memory location associated with that frequency, a mask has effectively been placed on all transmissions of that classification. Similarly, when it is desired to remove the mask, zero may be written into each location containing all ones, resulting in a new tag initialization cycle upon the first subsequent access of each such location.

The final control function, the recycle segment address function, occurs when the ten most significant bits (MSB's) of the sorting tag are zeros and at least one of the six least significant bits (LSB's) is not zero. The purpose of this function is to provide a finer resolution of sorting tags in another segment 18 of tag memory 17 than was previously found in the accessed location. The recycle command replaces the segment address read from the input data block with the six LSB's of the sorting tag and conducts a new sorting tag access based on the new segment address and the original parametric data read from the input data block.

Figure 4:
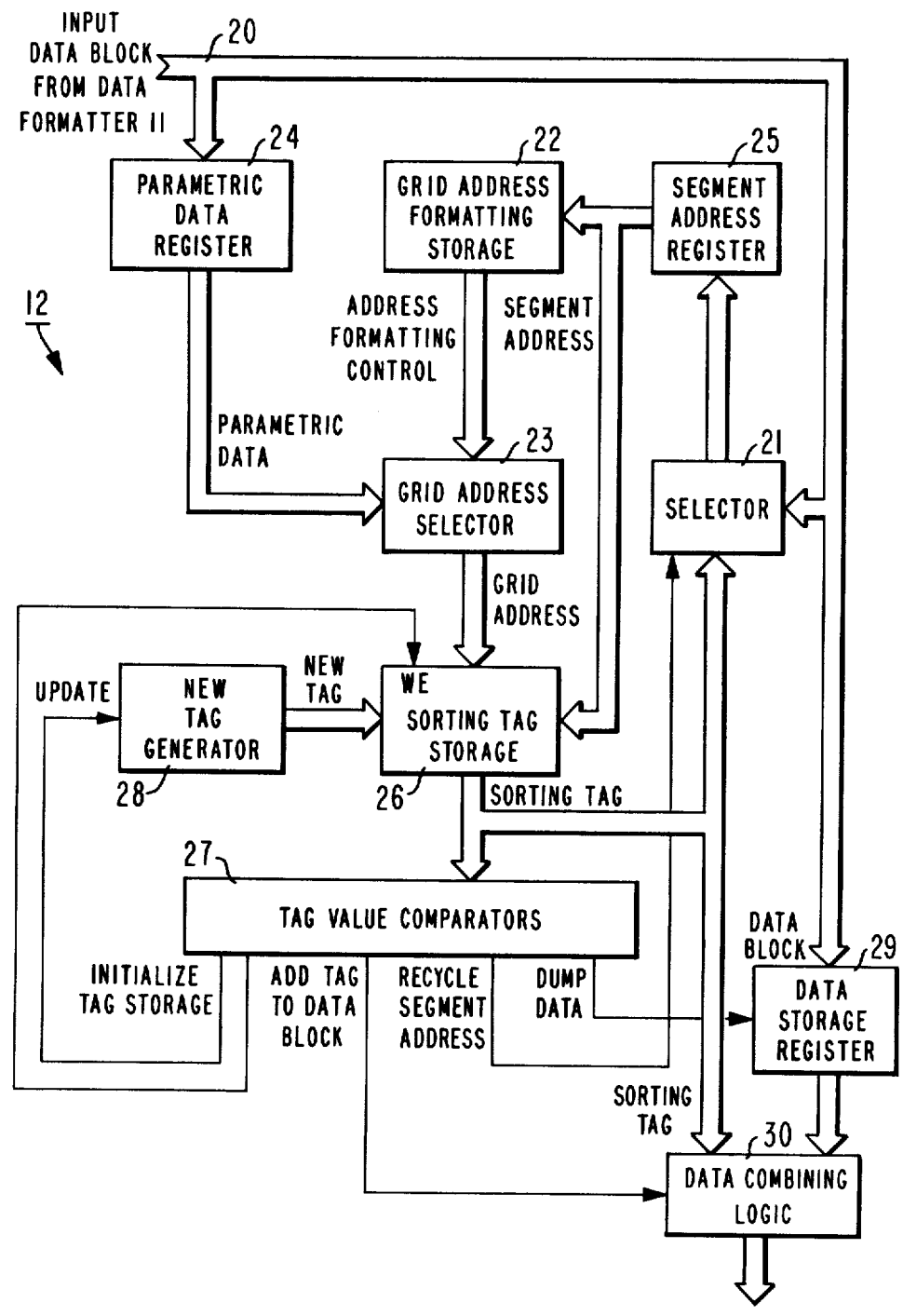
FIG. 4 is a functional block diagram of the invention.

FIG. 4 is a functional block diagram of the data sorter 12 useful in explaining the operation of this subsystem. This figure does not include interconnections between the data sorter 12 and the control processor 15, as the latter is not necessary for an understanding of the operation of the former.

Input data from data formatter 11 arrives on data path 20 and, as it passes through the data sorter 12 into the data storage register 29, portions of the data block are additionally stored elsewhere in the data sorter 12. One portion, the segment address, shown in FIG. 2a as comprising a 6-bit portion of the first word of the input data block, is input through selectors 21 and is stored in the segment address register 25. A second portion, the formatted parametric data, shown in FIG. 2a as comprising the entire 32 bits of the second word of the input data block, is stored in the parametric data register 24.

The data stored in the segment address register 25 provides addressing to the grid address formatting storage 22 which outputs provide 50 bits of address formatting control to the grid address selector 23 operating on the data stored in the parametric data register 24. The 50 address formatting control bits select ten of the 32 parametric data bits and arrange the ten selected bits in a predetermined order, thus creating the grid address signals to the sorting tag storage 26. The six segment address signals from register 25 provide additional addressing to the sorting tag storage 26.

The sixteen addressing signals applied to the sorting tag storage 26 uniquely define a single memory word, and that word appears at the storage output as the sorting tag. If the sorting tag assumes a value between $(40)_{16}$ and $(FFFE)_{16}$, inclusive, the sorting tag will be merged in the data combining logic 30, under the control of a signal generated by the tag value comparators 27, with the data block stored in the data storage register 29 for transmission onto the data pipeline 13. Otherwise, the sorting tag provides a control function of the data sorter 12, which function is to be determined by its value as decoded in the tag value comparators 27.

For one value of sorting tag, namely zero, the sorting tag storage 26 is directed, via its write enable (WE) input, to initialize the addressed location by writing the new tag represented by the signals at the output of the new tag generator 28 into the addressed location of the sorting tag storage 26. After this write operation is complete, the new tag generator 28 is directed to update its contents to thereby prepare a different new tag for subsequent initializations.

A second value of sorting tag, namely all ones, or $(FFFF)_{16}$, causes the tag value comparators 27 to send a control signal to the data storage register 29 causing the data block stored therein to be dumped, thereby inhibiting transmission of that data block along the pipeline 13.

Finally, detection of a range of sorting tag values, namely one through $(3F)_{16}$, inclusive, causes a fixed portion of the sorting tag to be steered through selectors 21 and to replace the previous contents of the segment address register 25. The operations involving grid address formatting storage 22, grid address selector 23, and sorting tag storage 26, as described above, are repeated for this new segment address, resulting in a sorting tag obtained from a different location within the sorting tag storage 26.

Figure 5:
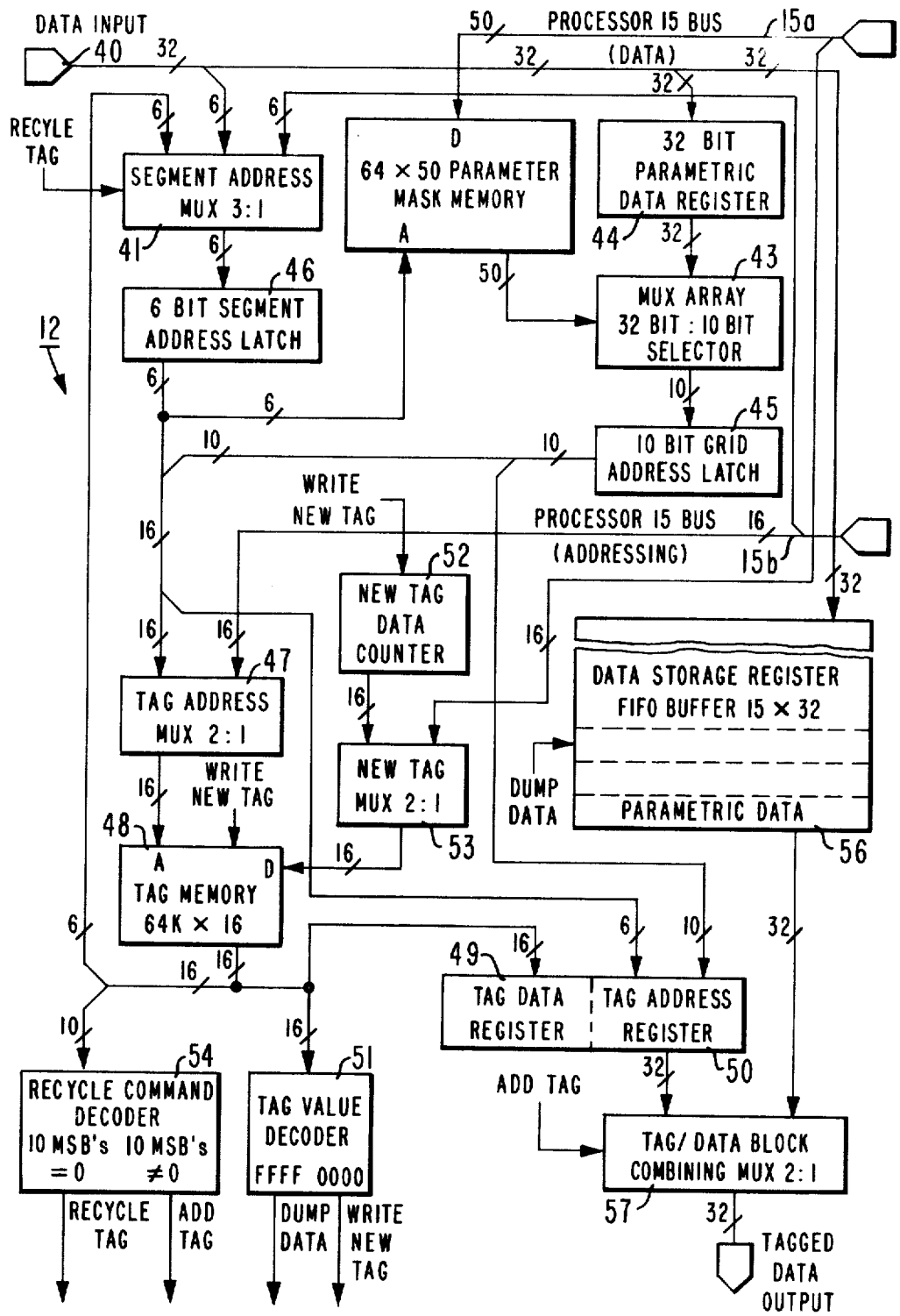
FIG. 5 is a block diagram of the present invention depicting functional and structural organization.

FIG. 5 illustrates in more detail the data sorter 12 of FIG. 4, including structural as well as functional description, and including further information on signal paths, while still depicting the subsystem in block diagram form. In addition, FIG. 5 discloses the areas of the data sorter 12 where the control processor 15 may exert an influence.

Control processor 15 may be called upon during the course of pulse data processing, or in an off-line mode, to alter the contents of the grid address formatting storage 22 (in FIG. 4) or the sorting tag storage 26 (in FIG. 4) in response to changed system requirements. FIG. 5 shows in block diagram form the data paths used to accomplish these objectives.

FIG. 5 illustrates buses by which processor 15 provides addressing and data information to the data sorter 12. Data bus 15a carries 50 bits of data information, used to alter the data words in parameter mask memory 42 and tag memory 48. Data bus 15b carries sixteen bits of addressing information, used to access a specific word in parameter mask memory 42 or tag memory 48. Control bus 15c from processor 15 provides a plurality of control signals. These signals will be shown in subsequent figures and discussed with reference to the functions described.

Microprocessors of the type normally used in this capacity generally have a small number of data port bits by which they interface with all external devices, including output registers and memories. There are a variety of ways in which the processor data is steered to a specified output register, but one very common method involves a two-cycle data output instruction, in which during the first cycle the information at the processor data port specifies the output register to be loaded, and the data port information during the second cycle is the data to be loaded in the specified output register. Hence, a processor having an eight-bit data port can connect to as many as $2^8$ or 256 eight-bit output registers, using the above-described scheme. A control signal from the processor to an external device may be provided as one bit of a processor output register, and a strobe pulse may be created, for example, by two data output instructions to that register in rapid succession, the first instruction turning the strobe pulse on and the second instruction turning it off.

The foregoing is but one example of a method by which complex bus structures may be provided by a microprocessor having a relatively small data port. Other methods may be employed depending on the processor selected. The specific method selected is of no real importance to this disclosure. What is important is the existence of a processor data bus 15a, addressing bus 15b, and control signal bus 15c, all of which can be implemented by well-known methods for any processor.

The data in the 64-word by 50-bit parameter mask memory 42 (the grid address formatting storage 22 of FIG. 4) may be altered under the control of processor 15. Six bits of addressing information from an addressing bus 15b of processor 15 are applied through the segment address select multiplexer (MUX) 41 to the segment address latch 46. The six outputs of latches 46 are sufficient to address the 64 words of memory 42. Hence, processor 15 may cause the 50 bits of information on the processor data bus 15a to be written into the location in memory 42 defined by the six address bits in latch 46.

Similarly, sixteen bits of addressing information provided on the processor addressing bus 15b to the addressing (A) inputs of tag memory 48 (the sorting tag storage 26 of FIG. 4), through tag address multiplexer (MUX) 47, are sufficient to address every location of memory 48. Sixteen bits of information provided on the processor data bus 15a to the data (D) inputs of memory 48, through new tag multiplexer (MUX) 53, may be written into the location in memory 48 defined by the sixteen addressing bits.

In normal pulse data tagging operation, the subsystem of FIG. 5 operates as follows: A block of input data applied at input terminal 40 is read into the data storage register 56. One predetermined segment of that same data is stored in segment address latches 46, via segment address MUX 41, and another predetermined segment is stored in parametric data register 44. The data stored in latches 46 provide the addressing to the parameter mask memory 42 which outputs provide the control for selecting, in the multiplexer (MUX) array 43, ten of the 32 bits of data stored in the data register 44.

The ten outputs of the MUX array 43 are stored in the grid address latch 5, and the latch 45 outputs, in combination with the latch 46 outputs, are applied to the sixteen address (A) inputs of the tag memory 48, via the tag address MUX 47. The tag memory word accessed by the sixteen address bits is applied to the inputs of the tag value decoder 51 and the recycle command decoder 54 and is stored in the tag data register 49.

The tag value decoder 51 determines if the contents of the data storage register 56 should be dumped (tag value=FFFF), or if a new tag, generated by the new tag data counter 52 should be input to the tag memory 48 via the new tag MUX 53 (tag value=0000). The recycle command decoder 54 determines if the word accessed from the tag memory 48 should be recycled through the segment address MUX 41 (all ten MSB's=0), or if the word accessed from the tag memory 48 is a valid sorting tag (not all ten MSB's=0). A valid sorting tag is the routing information which the processors 14a, 14b, . . . 14n recognize when the data block is transmitted on the data pipeline 13.

If the memory word (stored in the tag data register 49) is a valid sorting tag, it, along with the memory address (stored in the tag address register 50), is combined with the contents of the data storage register 56 by the tag/data block combining multiplexer (MUX) 57. The data output from MUX 57 is the data block having routing information in its header word, as shown in FIG. 2b. The header word is steered from registers 49 and 50 through MUX 57 via a first set of inputs while the ADD TAG control signal is present. This is followed by the sequence of data in the data storage register 56 applied to a second set of inputs to MUX 57, and steered through MUX 57 in the absence of the ADD TAG signal.

Figure 6:
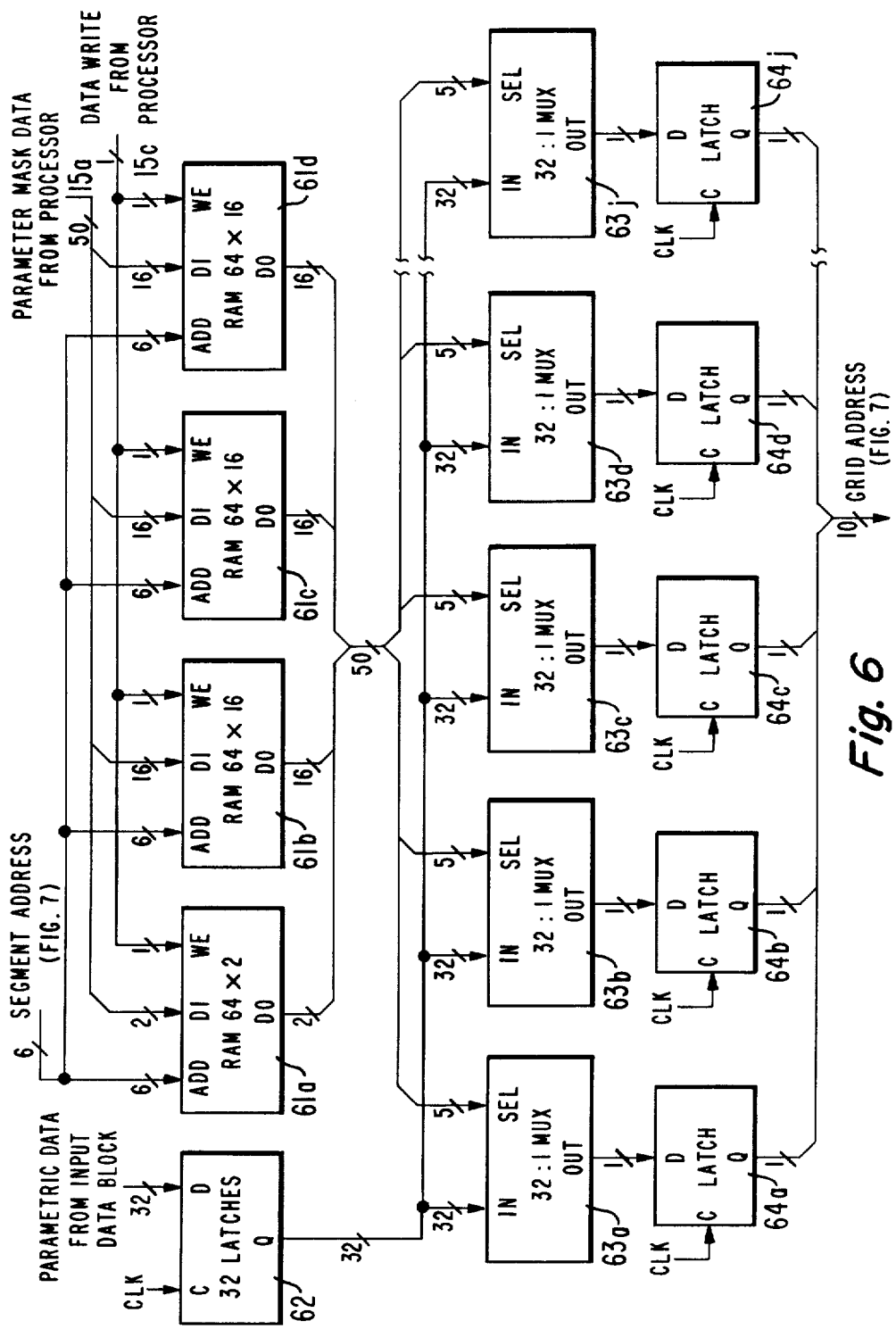
FIGS. 6, 7, and 8 are logic diagrams showing more of the detail of the embodiment of FIG. 5.
Figure 7:
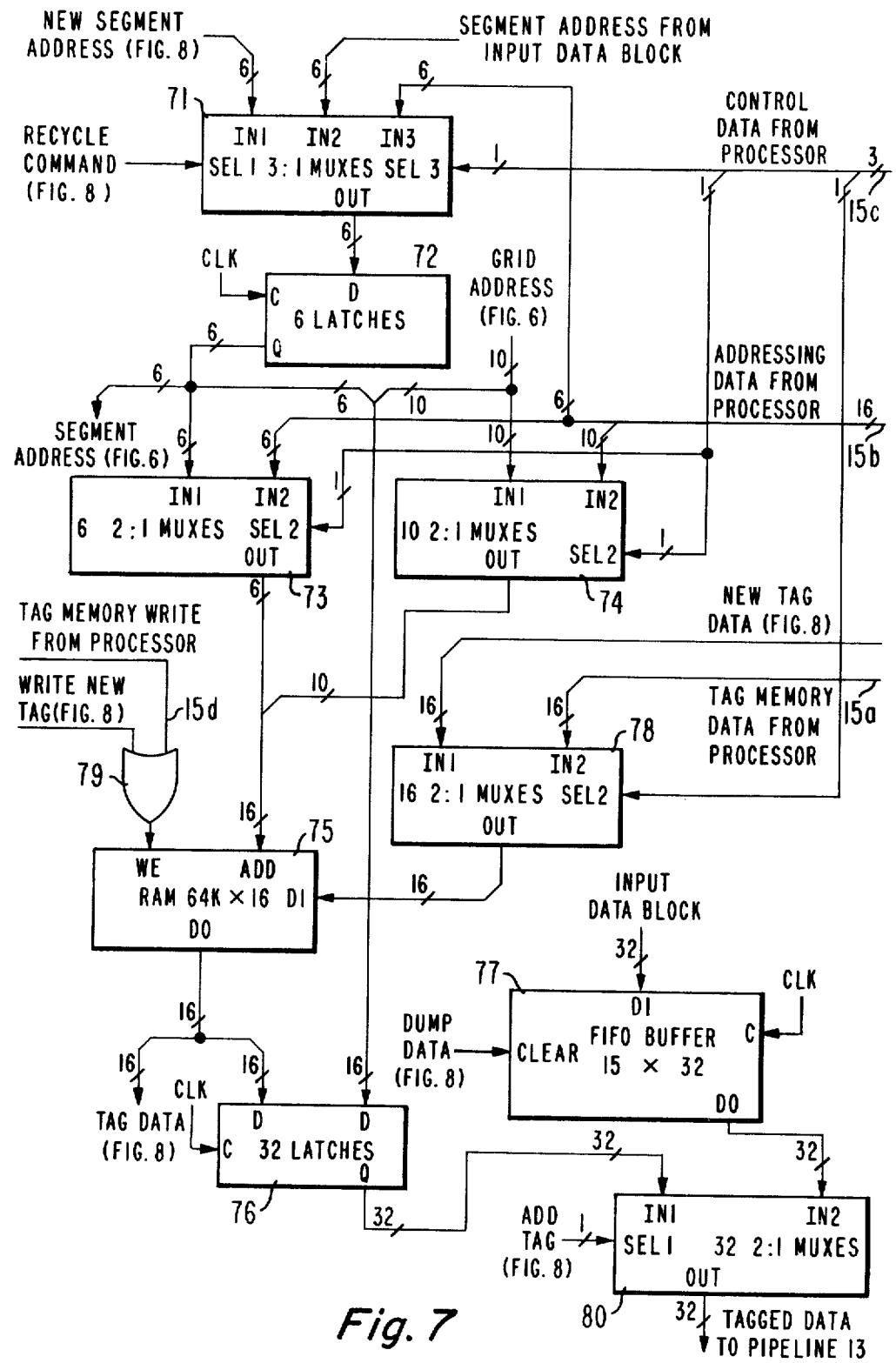
Figure 8:
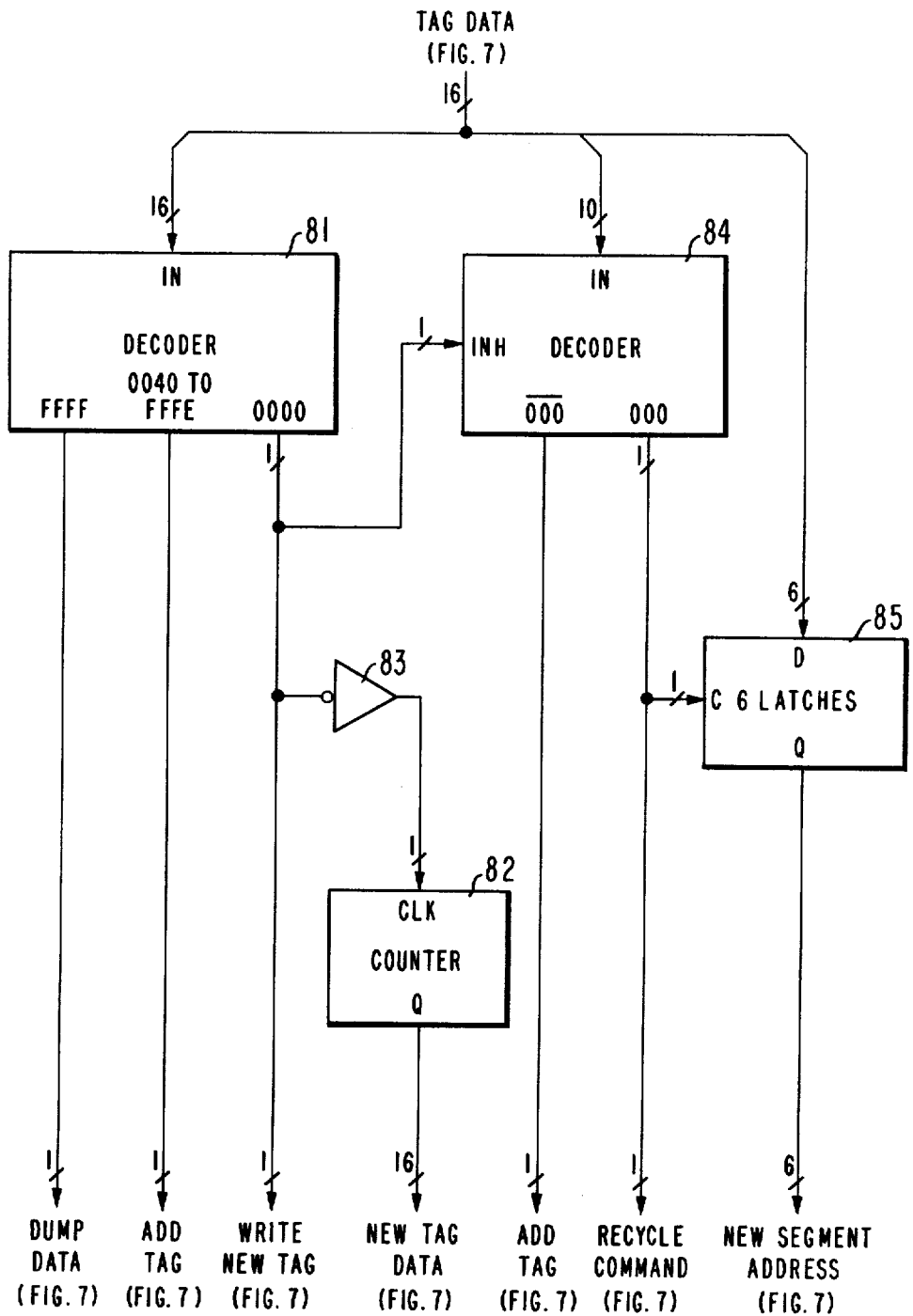

The final three figures, FIGS. 6, 7, and 8, depict the present invention in greater structural detail than the previous figures. It treats the heretofore functional blocks as digital logic elements which are familiar to those skilled in the art. For example, the logic elements to be described may be found in, or easily incorporated from, the family of MECL 10,000 series integrated circuits sold by Motorola Semiconductor Products, Inc., Phoenix, Ariz. The random access memories (RAM's), may be selected from the many RAM's of varying configurations and speeds sold by, for example, Mostek Corp, Carrollton, Tex. No special features or performance characteristics, attributable to a particular logic family, should be inferred from the designation of the digital families above; the caption within each block of FIGS. 6, 7, and 8, is sufficient to describe its logical function.

The memory address generation logic, incorporating parameter mask memory 42, MUX array 43, parametric data register 44, and address latch 45, as shown in FIG. 5, is shown in greater detail in FIG. 6. The memory address generation logic provides adaptive sorting tag access based on the segment address and the parametric data within the input data block. The six-bit segment address is applied to address (ADD) inputs of random access memories (RAM's) 61a, 61b, 61c, and 61d, referred to collectively as RAM 61, to access a commonly addressed word in each memory. The RAM's 61b, 61c, and 61d, each having 64 sixteen-bit words, and RAM 61a, having 64 two-bit words, may be considered a single RAM 61 having 64 words of 50 bits each. The 50 outputs (DO) from RAM 61 are applied to the select (SEL) inputs of ten 32-to-one multiplexers (MUX) 63a, 63b, 63c, . . . 63j, referred to collectively as MUX 63. The 50 RAM 61 outputs are equally distributed to the MUX 63 SEL inputs, five to each MUX 63, thereby providing a selection capability from among $2^5$ or 32 data inputs.

The 32 bits of parametric data from the input data block are applied respectively to the 32 data (D) inputs of latches 62 and are clocked in at a time when the data is stable. The 32 outputs (Q) of latches 62 are applied to the data inputs (IN) of the ten multiplexers (MUX) 63. Hence, the five SEL inputs select one of the 32 signals applied at the IN inputs for each of the ten MUX 63 to provide ten MUX 63 outputs (OUT) selected from among the bits of parametric data, the selection and the configuration thereof governed by the six segment address bits.

The ten signals at the MUX 63 outputs (OUT) are applied to the data (D) inputs of latches 64a, 64b, 64c .

. . 64j, referred to collectively as latches 64, and are clocked into the ten latches 64 at some time after the RAM 61 data has stabilized and the propagation through the MUX 63 is complete. The signals at the ten outputs (Q) of the latches 64 are address bits to be applied to the tag memory 48 (in FIG. 5).

One indication of the adaptive capability of the present invention is the ability to alter the contents of RAM 61 under processor control, either during data processing or in an off-line mode. As will be discovered in a subsequent discussion, the control processor 15 has the ability to set the segment address which is applied to the ADD inputs of RAM 61. Parametric mask data on a 50-bit bus 15a may be applied by the processor 15 to the DI inputs of RAM's 61a, 61b, 61c, and 61d, and a pulse on the processor's DATA WRITE line 15c enables the processor data into the selected memory location. In actuality, the processor 15 does not provide a 50-bit bus. It is more likely that an eight, twelve, sixteen, or 24-bit processor bus is multiplexed to provide the required 50 parallel bits, but multiplexing schemes of this type are well known and the details of this arrangement are not important to the present invention. For his embodiment the applicant has selected a Z8000 microprocessor, sold by Zilog, Inc. of Cupertino, Calif. The Z8000 microprocessor has a 16-bit bus structure.

The tag storage unit, incorporating segment address MUX 41, segment address latch 46, tag address MUX 47, tag memory 48, tag data register 49, tag address register 50, new address MUX 53, data storage register 56, and tag/data block combining MUX 57, as shown in FIG. 5, is shown in greater detail in FIG. 7. Six multiplexers (MUX) 71 select the segment address bits from among three sources. The first source is the set of six new segment address lines applied to inputs IN1 of MUX 71, and controlled by the RECYCLE COMMAND signal applied to the SEL1 input. These signals will be dealt with during the discussion of FIG. 8. The second source of segment address bits is the segment address data taken from the input data block as it is transmitted from the data formatter 11, and applied to inputs IN2 of MUX 71. This is the normal source of the segment address data and, as such, no explicit select lines are shown. The third source of segment address bits, applied to inputs IN3 of MUX 71, is the control processor 15, which provides the segment address data on a 6-bit bus 15b and a single control line applied to input SEL3 of MUX 71. It is in this manner that the processor 15 forces address data to RAM 61 to thereby alter the memory's parameter mask data as described in the discussion of FIG. 6. The six output signals (OUT) from MUX 71 are individually applied to the D inputs of six latches 72 and clocked into the latches 72 via a clock signal when the data is stable.

The signals at the six outputs (Q) of latches 72, the tag select data are individually applied to six two-to-one MUXes 73 and to the D inputs of six latches 76. MUX 73 selects from the six signals latched at the Q outputs of latches 72 and six bits of tag addressing data provided via a data bus 15b from the processor 15. The former six signals are applied at the IN1 inputs of MUX 73 and, because this is the normal source of segment address data, no explicit selection is shown; the latter six signals are applied at the IN2 inputs and are selected via the processor control signal 15c applied to MUX 73 at the SEL2 input. MUX 74 consists of ten two-to-one MUXes having a function very similar to that of MUX 73. It provides selection between the set of ten grid address signals derived, as shown in FIG. 6, from the Q outputs of latches 64, and ten bits of tag addressing data provided via a data bus 15b from the processor 15.

The sixteen signal lines, from the combined outputs (OUT) of MUX 73 and MUX 74, are applied to the sixteen address (ADD) inputs of RAM 75. In the applicant's embodiment RAM 75 comprises sixteen 64-kilobit random access memory chips, Model No. MK4164 sold by Mostek Corp., configured into a single memory having 65,536 (64K) words of sixteen bits each. The sixteen-bit memory word, addressed by the address data applied to the ADD inputs, appears at the data output (DO) signals of RAM 71. This sixteen-bit word is the tag data, and it is applied to sixteen of the D inputs of latches 76. These sixteen bits, plus the sixteen signals at the Q outputs of latches 72 and (in FIG. 6) latches 64, are clocked into latches 76 when the input signals are stable, and the resulting 32-bit word, appearing at the Q outputs of latches 76, is the revised header word including the sorting tag to be affixed to the data block.

The input data block transmitted by the data formatter 11 into the data sorter 12 (shown in FIG. 1) may have the formatting scheme of FIG. 2a. The data block is applied to the data inputs (DI) of the First-In-First-Out (FIFO) storage buffer 77 as shown in FIG. 7. In the applicant's embodiment, FIFO buffer 77 has the storage capacity of 64 words of 32 bits each, although, for the application described, fifteen words are sufficient for the data sorter 12 which handles a data block having a maximum length of sixteen words. The input data block is clocked rapidly through the FIFO buffer 77 until the first word, containing the segment address data, has been clocked out of the buffer 77 (and subsequently lost) and the second word, containing the formatted parametric data, has reached the foremost position in the buffer 77. It should be noted that the segment address data in the first word of the data block has not been entirely lost; it is input by MUX 71 and stored by latches 72 during transit between data formatter 11 and FIFO buffer 77. Similarly, the formatted parametric data has been stored by latches 62 (FIG. 6) during that transit.

The operations of filling FIFO buffer 77 and setting the contents of latches 75 occur simultaneously. After both operations have been completed, and the data pipeline 13 (shown in FIG. 1) is ready for the transmission of data, the thirty-two bits of tag data stored in latches 76 are steered through the 32 two-to-one multiplexers (MUX) 80, from the IN1 inputs to the outputs (OUT) via the ADD TAG signal applied to the corresponding select input (SEL1). First the routing information stored in latches 76 is placed on the data pipeline 13, then the data stored in FIFO buffer 77 and applied to the IN2 inputs of MUX 80, are steered through to the OUT terminals of MUX 80 and onto the pipeline 13.

FIG. 2b represents the pulse data block having the tag data appended which appears on the pipeline 13 in response to the input pulse represented in FIG. 2a. It should be noted at this point that the data utilization means, multiprocessor system 14 shown in FIG. 1, requires only the sixteen-bit sorting tag output (DO) of RAM 75 stored in sixteen of the latches 76. The remaining sixteen bits stored in latches 76, namely the segment address (6 bits) and grid address (10 bits), are transmitted along the data pipeline 13 to provide the maximum available information to the multiprocessing system 14.

FIG. 7 depicts the logic elements of the data sorter 12 by which the control processor 15 is able to selectively modify the contents of RAM 75. Control processor 15 provides addressing signals via bus 15b at the IN2 inputs of MUX 73 and MUX 74. A control signal 15c applied to the SEL2 inputs of those MUXes 73 and 74 steers the processor addressing data through MUXes 73 and 74 to the ADD inputs of RAM 75. Tag data from processor 15 is applied via bus 15a to the IN2 inputs of MUX 78 and is steered through MUX 78 to the Data In (DI) inputs of RAM 75 under the control of a processor signal applied via control bus 15c to the SEL2 inputs of MUX 78. Finally, with the data and addressing signals of processor 15 applied at the corresponding inputs of RAM 75, a TAG MEMORY WRITE signal pulse from processor 15 on lead 15d is applied to the Write Enable (WE) input of RAM 75, via OR gate 79, causing the data to be written in addressed memory word.

The control processor 15 also has the ability to modify the contents of RAM 61 (shown in FIG. 6). FIG. 7 depicts the logic elements employed to provide processor 15 selection of the addressing of RAM 61. Six signals defining a RAM 61 address are applied via bus 15b to the IN3 inputs of MUX 71, and appear at the output (OUT) terminals of MUX 71 under the control of a processor 15 control signal applied via control bus 15c to the SEL3 input. The six addressing signals thus selected are applied to the D inputs of latches 72 and are clocked into latches 72 when the data is stable. The six Q outputs of latches 72 are applied to the ADD inputs of RAM 61 (in FIG. 6) thus providing processor 15 control of the address selection of RAM 61 for the memory write operation of RAM 61 described earlier in connection with FIG. 6.

The tag value decoder 51, new tag address counter 52, and recycle command decoder 54, as shown in FIG. 5, are shown in greater structural detail in FIG. 8. The sixteen-bit tag data word is applied to the inputs (IN) of decoder 81 and decoder 84. Decoder 81 provides the DUMP DATA control signal to the CLEAR input of FIFO buffer 77 (in FIG. 7) when the all ones, or (FFFF)$_{16}$, data word is decoded, and it provides the WRITE NEW TAG control signal to the OR gate 79 (in FIG. 7) when the all zeros data word is decoded.

Counter 82 provides at its Q outputs a sixteen-bit word to the IN1 inputs of the sixteen two-to-one multiplexers (MUX) 78 (in FIG. 7) by which a new tag word may be written into RAM 75 (in FIG. 7) via its DI inputs. At the completion of the new tag operation, the WRITE NEW TAG signal, through inverter 83, provides a clocking signal edge to the CLK input of counter 82 by which the counter data is updated. Counter 82 may be, for example, a binary or ring counter, for which the clocking signal provides an incrementing effect, or it may be a code-generating shift register arrangement, in which case the clocking signal causes a new codeword to be generated.

Decoder 84 examines the ten most significant bits (MSB's) of the tag data word for the all zeros condition. If this condition has occurred, and decoder 81 has not detected all zeros for the entire data word, the RECYCLE COMMAND control signal applied to the SEL1 inputs of the six three-to-one multiplexers (MUX) 71 (in FIG. 7) is activated, and the six least significant bits (LSB's) of the tag data word are clocked into latches 85. The signals at the six Q outputs of latches 85 are applied respectively to the six IN1 inputs of MUX 71 and are steered through MUX 71 by the RECYCLE COMMAND signal applied to the SEL1 inputs. The 0000 output of decoder 81, applied to the inhibit (INH) input of decoder 84, prevents the occurrence of the RECYCLE COMMAND when a new tag operation is warranted. The $\overline{000}$ (not all zeros decoded) output of decoder 84 provides the ADD TAG select signal to the 32 two-to-one multiplexers (MUX) 80 (in FIG. 7) which combine the tag data word with the data block stored in FIFO buffer 77.

What is claimed is:

1. An apparatus for generating routing information and for adding said information to a block of digitized data being sent from a source of such data to a utilization device for such data, said apparatus comprising:

first storage means responsive to said source of digitized data for storing a first segment of said data block;

a first addressable memory responsive to the data contained in said first storage means for providing predetermined data signals;

means having input, output, and control terminals, responsive to said predetermined data signals of said first memory applied to its control terminals, for selecting data to be applied to its output terminals from among data of a second segment of said data block, being applied to its input terminals;

a second addressable memory, having output terminals, said second addressable memory coupled to said first storage means and said data selecting means for providing at its output terminals a data word accessed from said second memory in response to an address formed by the data stored in said first storage means and the selected data at the output terminals of said selecting means;

means coupled to said output terminals of said second memory and responsive to values of said data word accessed from said second memory for generating a plurality of control signals;

generator means coupled to said second memory and responsive to a first one of said plurality of control signals for transferring a data word stored in said generator means to said second memory for storage therein at said address formed by the data stored in said first storage means and the selected data at the output terminals of said selecting means;

means coupled to said second memory and to said first storage means and responsive to second one of said plurality of control signals for replacing the data stored in said first storage means by said data word accessed from said second memory for causing a data word to be accessed from said second addressable memory in a subsequent cycle of data transfer; and means responsive to a third one of said plurality of control signals for combining said data word accessed from said second memory with said block of digitized data for transmission to said utilization device.

2. The apparatus according to claim 1 including second storage means coupled between said source of digitized data and said combining means for storing one of said blocks of digitized data.

3. The apparatus according to claim 2 further including means coupled to said second storage means and responsive to a fourth one of said plurality of control signals for clearing the data stored within said second storage means.

4. The apparatus according to claim 1 further including means coupled to said generator means and responsive to said first control signal for altering the value of the data word stored in said generator means.

5. The apparatus according to claim 1 including third storage means responsive to said source of digitized data for storing said second segment of said data block.

6. The apparatus according to claim 1 wherein said first memory is adapted to receive external signals for the purpose of altering said predetermined signals of said first memory.

7. The apparatus according to claim 1 wherein said second memory is adapted to receive external signals for the purpose of altering said data words of said second memory.

* * * * *